United States Patent [19]
Shimada et al.

[11] Patent Number: 5,993,036
[45] Date of Patent: Nov. 30, 1999

[54] AUTOMOTIVE LAMPS

[75] Inventors: Takahiko Shimada; Kazuo Akiyama; Kazuhiro Yamazaki, all of Shizuoka, Japan

[73] Assignee: Koito Manufacturing Co., Ltd., Tokyo, Japan

[21] Appl. No.: 08/703,781

[22] Filed: Aug. 27, 1996

[30] Foreign Application Priority Data

Sep. 6, 1995 [JP] Japan ................................. 7-228710

[51] Int. Cl.⁶ .............................. B60Q 1/00; F21V 31/02
[52] U.S. Cl. ............................................ 362/549; 362/267
[58] Field of Search ................................. 362/61, 80, 267, 362/306, 369, 390, 496, 546, 548, 549, 459; 277/235 A, DIG. 6

[56] References Cited

U.S. PATENT DOCUMENTS

| | | |
|---|---|---|
| 2,910,577 | 10/1959 | Bolmeyer ................................. 362/267 |
| 3,656,105 | 4/1972 | Steltzer et al. ............................ 362/80 |
| 3,678,635 | 7/1972 | Vagi et al. ................................. 362/80 |
| 3,809,880 | 5/1974 | Daumueller et al. ....................... 362/80 |
| 3,954,274 | 5/1976 | Grandlic et al. ..................... 277/DIG. 6 |
| 4,445,163 | 4/1984 | Ziaylek, Jr. ............................ 362/267 |
| 4,681,800 | 7/1987 | Zerfass et al. ..................... 277/DIG. 6 |
| 4,854,636 | 8/1989 | Greenhalgh et al. ..................... 362/61 |
| 4,898,638 | 2/1990 | Lugez ................................. 277/DIG. 6 |
| 5,047,906 | 9/1991 | Weber ..................................... 362/80 |
| 5,138,531 | 8/1992 | Daumueller et al. ...................... 362/61 |
| 5,685,628 | 11/1997 | Feger et al. ............................ 362/267 |

FOREIGN PATENT DOCUMENTS 4011642  5/1991  Germany ................................ 362/267

Primary Examiner—Alan Cariaso
Attorney, Agent, or Firm—Sughrue, Mion, Zinn, Macpeak & Seas, PLLC

[57] ABSTRACT

An automotive lamp which includes a lamp body, a gasket disposed between the lamp body and an automobile body panel for sealing a back side of the lamp, a seal leg projecting from the lamp body for attaching thereto the gasket, wherein the foamed gasket is molded integrally with a tip end part of the seal leg.

10 Claims, 5 Drawing Sheets

AUTOMOTIVE LAMPS

BACKGROUND OF THE INVENTION

1. Field of the Invention

The present invention relates to an automotive lamp in which a gasket for sealing a back side of the lamp is disposed between a lamp body and an automobile body panel so that water, dusts and the like are prevented from entering the back side of the lamp where wires connecting to a lamp bulb or the other electrical equipment are arranged.

2. Related Art

FIG. 5 is a vertical sectional view showing a conventional automotive lamp of the type as disclosed, for example, in Unexamined Japanese Patent Publication No. Hei. 3-15748. The conventional automotive lamp shown in FIG. 5 includes a lamp body 1 which is formed on a back wall thereof with a seal leg 2 projecting therefrom for surrounding a bulb insertion hole 2 and a gasket 8 disposed between the seal leg 2 and an automobile body panel 6. Both a front and a rear side of the gasket 8 have a respective high adhesive surface so that the gasket 8 sticks both to the seal leg 2 and the automobile body panel 6. In the figure, reference numeral 3 designates a front lens and a reference numeral 4 designates lamp bulb.

FIG. 6 is a sectional view of an essential part of another conventional automotive lamp. As shown in FIG. 6, a gasket 8A is formed like an endless web a cross section of which is U-shaped. An adhesive agent is applied, if desirable, to a tip end of the seal leg 2 so that the gasket 8A sticks to the seal leg 2.

According to the conventional gasket 8 as described above and shown in FIG. 5, however, since the gasket 8 is formed by cutting out a seat-like material to have a frame-shape to fit to the configuration of the tip end of the seal leg 2, the yield rate of the material is very unsatisfactory which raises manufacturing cost.

Further, the high adhesive surfaces of the gasket 8 shown in FIG. 5 are actually made from a double-sided adhesive tape. More specifically, the double-sided adhesive tape with a peel-off sheet on each side is attached to each the front and rear surfaces of the gasket 8. Accordingly, during assembly of the conventional automotive lamp, when the lamp is coupled to the automobile body, the gasket 8 is disposed between the seal leg 2 and the automobile body panel 6, the peel-off sheet on one side of the gasket 8 is peeled off to expose the adhesive surface, and then the adhesive surface is pressed against the seal leg 2 so that the gasket 8 sticks integrally to the seal leg 2. Next, the peel-off sheet of the other side of the gasket 8 is peeled off, and then the lamp is coupled to the automobile body, so that the adhesive surface of the gasket 8 sticks to the automobile body panel 6. Thus, the conventional automotive lamp requires complicated steps during assembly, which steps take a relatively long time. That is a problem because it raises the manufacturing cost.

On the other hand, according to the secondary conventional gasket 8A shown in FIG. 6, the gasket 8A is formed by the injection molding operation, and the cost for the mold die apparatus or the like is very high. In addition, the gasket 8A must be attached to the seal leg 2 prior to coupling the lamp to the automobile body. This is intricate. Further, in a case where no adhesive agent is applied to the tip end of the seal leg 2, the gasket 8A may sometimes drop off the seal leg 2.

SUMMARY OF THE INVENTION

The present invention was made in view of the foregoing difficulties and problems accompanying the conventional automotive lamps. Therefore, an object of the present invention is to provide an automotive lamp capable of simplifying coupling operation during assembly as well as improving the yield rate of materials for a gasket which is disposed between a seal leg and an automobile body panel.

The above and other objects can be achieved by a provision of an automotive lamp which, according to the invention, includes a lamp body, a gasket disposed between the lamp body and an automobile body panel for sealing a back side of the lamp, a seal leg projecting from the lamp body for attaching thereto the gasket, wherein the foamed gasket is molded integrally with a tip end part of the seal leg. Since the gasket is foam-molded integrally with the seal leg projecting from the lamp body and thereby in close-contact with the seal leg, it is not necessary to adhere the gasket to the seal leg by an adhesive agent or the like.

According to another aspect of the present invention, first, a nozzle injects a material for a foamed gasket into a gasket molding groove formed in a jig, and the injected material is left to thereby foam-expand. Next, a lamp body with a seal leg facing down is operated to move downward so that the seal leg is inserted in the molding groove, and the seal leg is held against the gasket material. As a result, the surface of the gasket is solidified. Afterwards, the gasket is released from the jig together with the lamp body and the seal leg, and the gasket is left in atmosphere so that the gasket is sufficiently solidified. Thus, the gasket is molded integrally with the seal leg.

Among these steps, if desired, the step in which the nozzle injects the gasket material, the step in which the lamp body is moved down to press-fit the seal leg into the foamed gasket material filled in the molding groove, and the step in which the lamp body is lifted to release the gasket from the molding groove together with the seal leg may be automated. If these steps are automated, an operator has to merely set the lamp body on an automation line and take the lamp body which is molded integrally with the gasket out of the automated product line. Hence, mass-production can be achieved while excessively reducing the manual works.

Further, if the seal leg is subjected to surface active treatment, the gasket would hardly detach from the seal leg because of the high adhesibility of the foamed gasket to the seal leg. As a result, easy treatment of the lamp with which the gasket is integrated, improved operation for coupling the lamp to the vehicle body, and good workability when the gasket is provided can be accomplished.

DESCRIPTION OF THE PREFERRED EMBODIMENTS

The present invention will now be described with reference to accompanying drawings.

Figure 1:
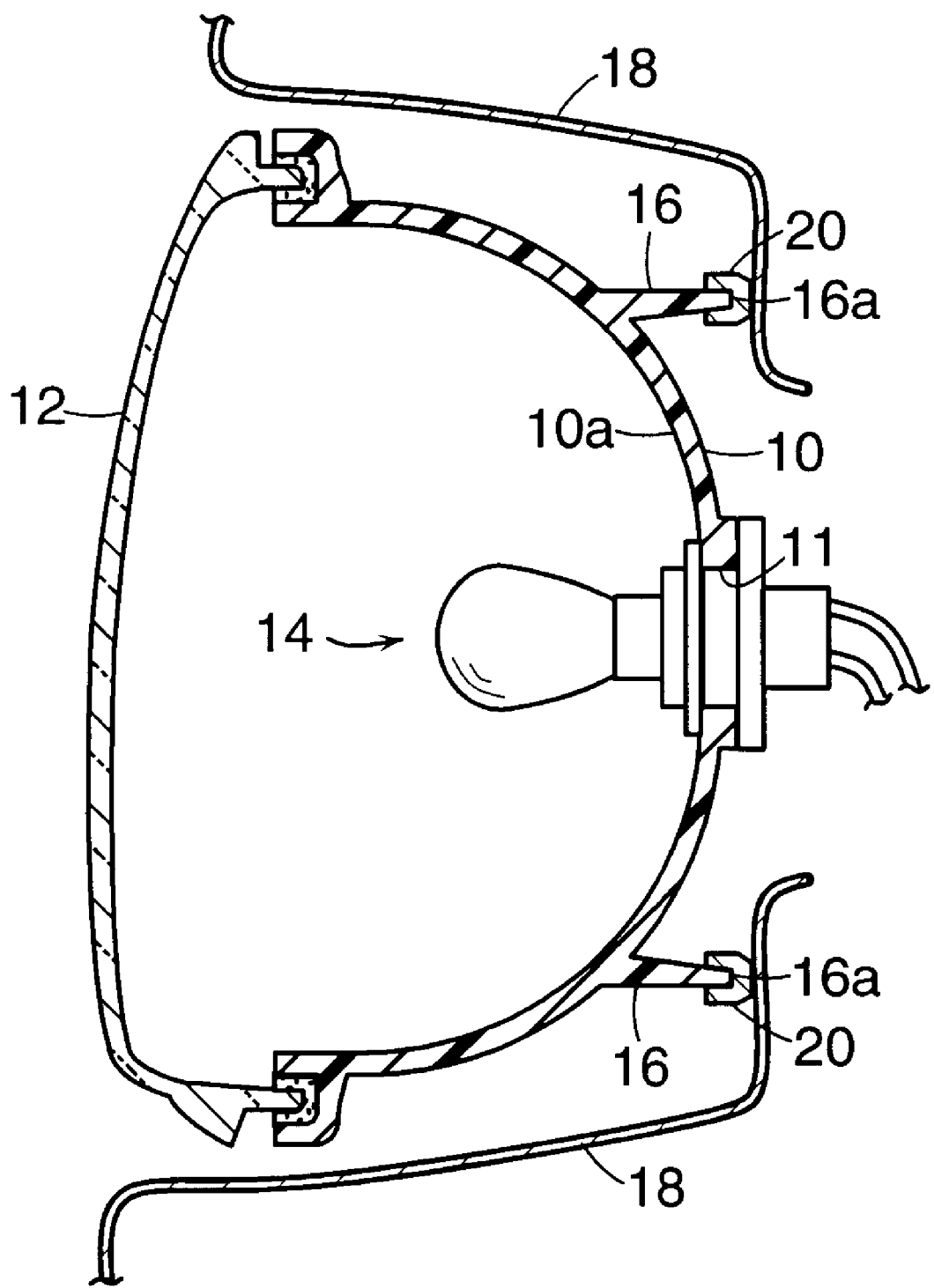
FIG. 1 is a vertical sectional view showing a clearance lamp to which a first embodiment of the present invention is applied.
Figure 2:
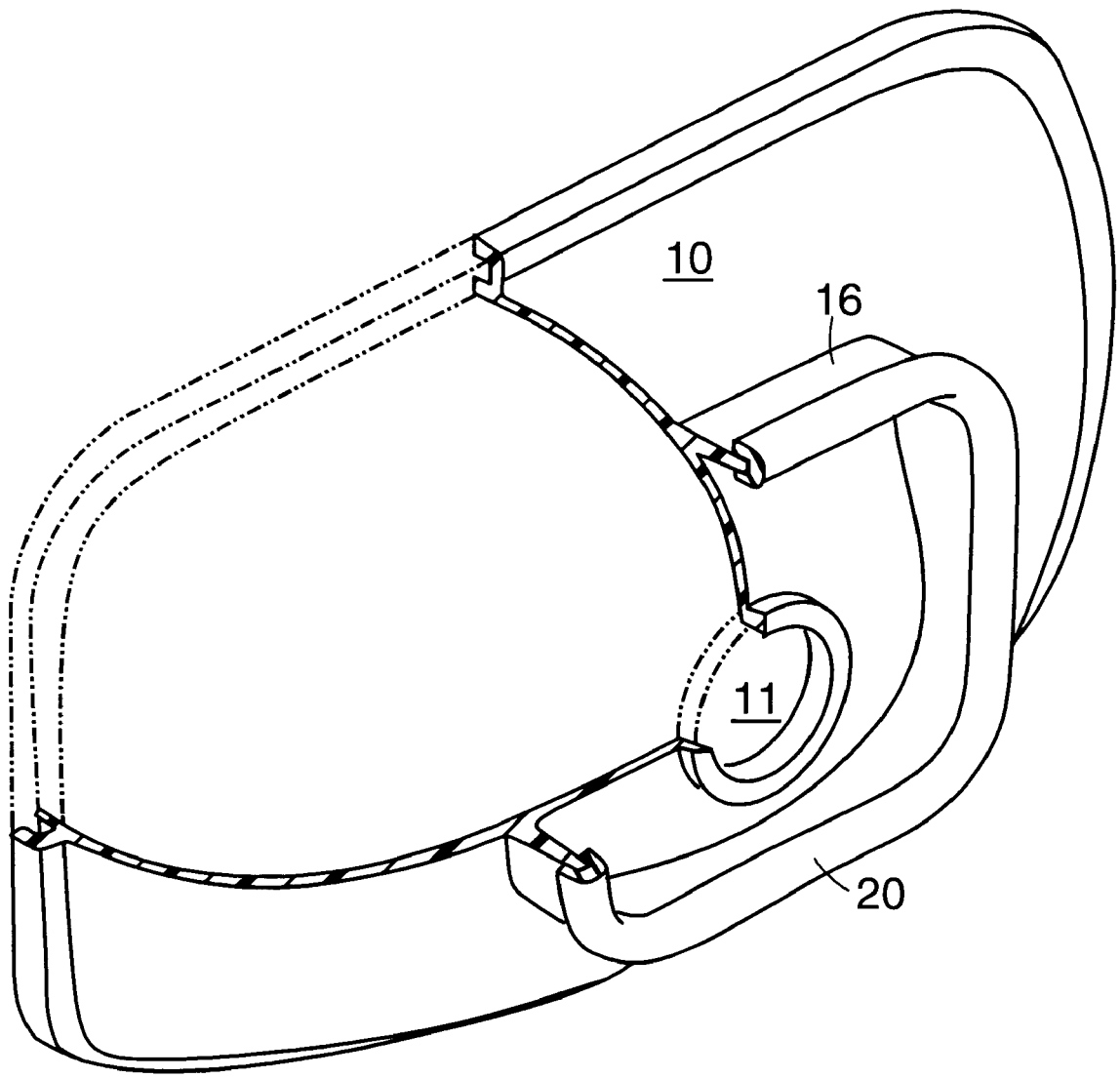
FIG. 2 is a partly cut away perspective view of a lamp body of the clearance lamp shown in FIG. 1.

FIGS. 1 through 3 show a clearance lamp for automobiles to which a first embodiment of the present invention is applied. More specifically, FIG. 1 is a vertical sectional view showing a clearance lamp to which a first embodiment of the present invention is applied, FIG. 2 is a partly cut away perspective view of a lamp body of the clearance lamp shown in FIG. 1, and FIGS. 3A, 3B, 3C and 3D are views for explaining steps of unitarily attaching a gasket to a seal leg.

As shown in the figures, the clearance lamp is provided with a cup-shaped lamp body 10 having a parabolic reflector 10a formed on an inner surface thereof, a front lens 12 coupled to a front opening of the lamp body 10, a bulb insertion hole 11 formed in a rear peak of the lamp body 10, and a lamp bulb 14 serving as a light source mounted on the bulb insertion hole 11.

A seal leg 16 extends backward from a back wall of the lamp body 10 in such a manner that the seal leg 16 surrounds the bulb insertion hole 11. A foamed gasket 20 is disposed between a tip end part 16a of the seal leg 16 and an automobile body panel 18. The foamed gasket 20 is molded integrally with the tip end part 16a of the seal leg 16. With this structure, the foamed gasket 20 has a highly tight connection capability with respect to the seal leg 16, and the gasket 20 hardly detaches from the seal leg 16 of the lamp body 10.

According to the present invention, it is not necessary to stick a gasket to a seal leg by using double-sided adhesive tapes or an adhesive agent as required by the conventional gaskets. In addition, it is quite simple and easy to dispose the gasket between the seal leg and the automobile body panel during the assembly of the lamp.

That is, since the gasket 20 is previously molded integrally with the seal leg 16 according to the present invention, the gasket 20 can be disposed between the seal leg 16 and the automobile body panel 18 at the same time when the lamp is coupled to the automobile body. In other words, when the lamp is mounted on the automobile body, the gasket 20 automatically comes to a condition where the gasket 20 is press-fitted between the seal leg 16 and the automobile body panel 18.

Further, since the gasket 20 is molded integrally with the seal leg 16, the gasket 20 is accurate in dimension and presents a flat surface. Accordingly, the gasket 20 has improved capability for close-contact, i.e., the gas sealability, with respect to the automobile body panel 18 and, therefore, water or dust is securely prevented from entering the back side of the lamp from the front side thereof.

The steps of integrally molding the gasket 20 with the seal leg 16 will now be described with reference to FIGS. 3A through 3D. A reference numeral 30 in FIGS. 3A to 3D designates a jig for transfer made from a flat metal plate and which is laid horizontally. A groove 32 for molding the gasket is formed in a front surface of the jig 30. The molding groove 32 extends along the same shape as the seal leg 16 and receives the same. A release agent is applied onto an inner surface of the groove 32.

Figure 3A:
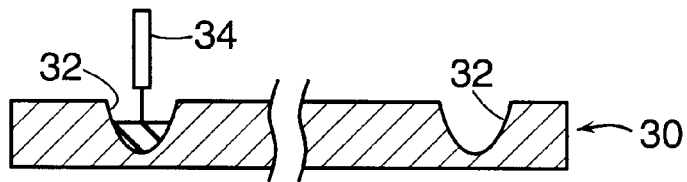
FIGS. 3A, 3B, 3C and 3D are views for explaining steps of unitarily attaching a gasket to a seal leg.
Figure 3B:
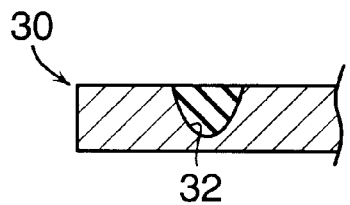
Figure 3C:
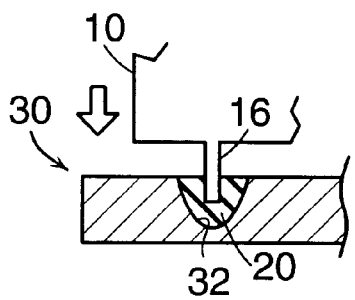
Figure 3D:
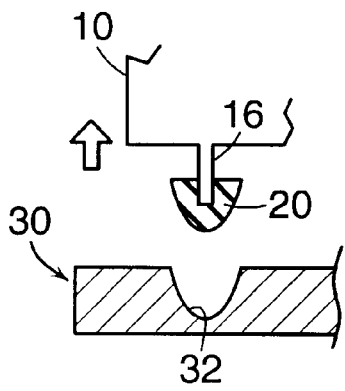

First, a nozzle 34 injects material for the foamed gasket into the groove 32 of the jig 30 as shown in FIG. 3A, and the injected material is left for several seconds to thereby foam-expand the material for gasket as shown in FIG. 3B. Next, the lamp body 10 with the seal leg facing down is operated to move downward so that the seal leg 16 is inserted in the molding groove 32 as shown in FIG. 3C, and the seal leg 16 is held pressing against the gasket material for a predetermined time period (several seconds). As a result, the surface of the gasket 20 is solidified. Afterwards, as shown in FIG. 3D, the gasket 20 is released from the jig 30 together with the lamp body 10 and the seal leg 16, and the gasket is left at atmospheric pressure for a predetermined time period (several seconds), so that the gasket 20 is sufficiently solidified. Thus, the gasket 20 is molded integrally with the seal leg 16.

In order to enhance the adhesibility of the gasket 20 to the seal leg 16, if desired, the seal leg 16 is subjected to surface active treatment such as primer, frame, ultra violet (UV), corona, plasma treatment or the like.

A resin material such as acrylonitrile-butadiene-styrene (ABS), acrylonitrile-acryl rubber-styrene (AAS), polymethylmethacrylate (PMMA), polypropylene (PP) or the like may be employed as the material of the lamp body 10 and the seal leg 16. On the other hand, a foamed material which is based on polyester, one-liquid urethane, two-liquid urethane, silicone resin or the like may be selected as a material of the foamed gasket. The material of the foamed gasket may preferably have heat-resistivity at 80° C. so that the gasket can maintain reliability even when subject to heat generated by the lamp bulb of the lamp.

Among the molding steps shown in FIGS. 3A through 3D, the FIG. 3A step in which the nozzle 34 injects the gasket material, the FIG. 3C step in which the lamp body 10 is operated to move downward to press-fit the seal leg 16 into the foamed gasket material filled in the molding groove 32, and the FIG. 3D step in which the lamp body 10 is lifted to release the gasket 20 from the molding groove 32 together with the seal leg 16, may be automated. If these steps are automated, an operator has to merely set the lamp body 10 on an automated product line and take the lamp body 10 which is molded integrally with the gasket 20 out of the automated line. Hence, mass-production can be achieved while excessively reducing the manual works.

Figure 4:
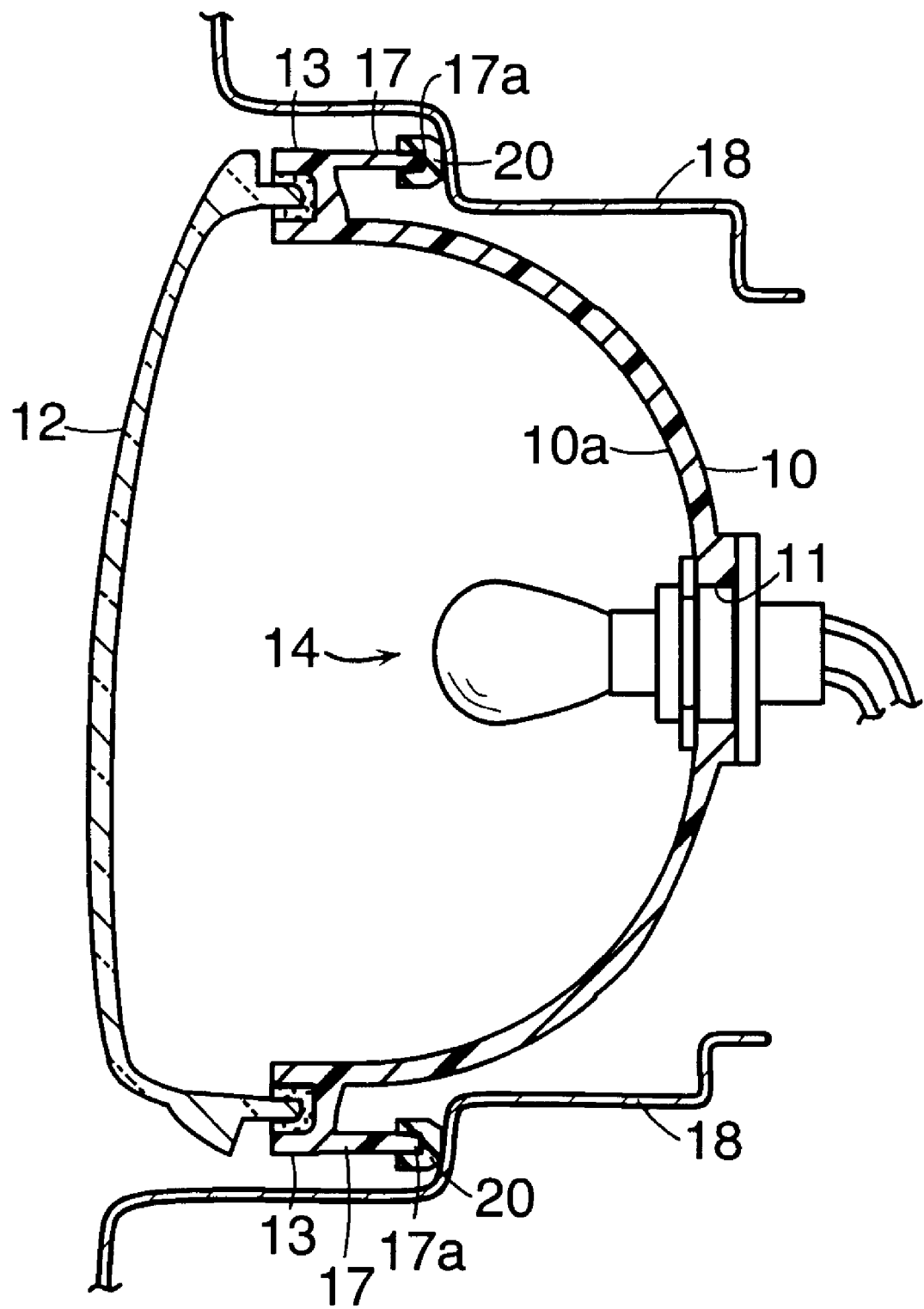
FIG. 4 is a vertical sectional view showing a clearance lamp to which a second embodiment of the present invention is applied.
Figure 5:
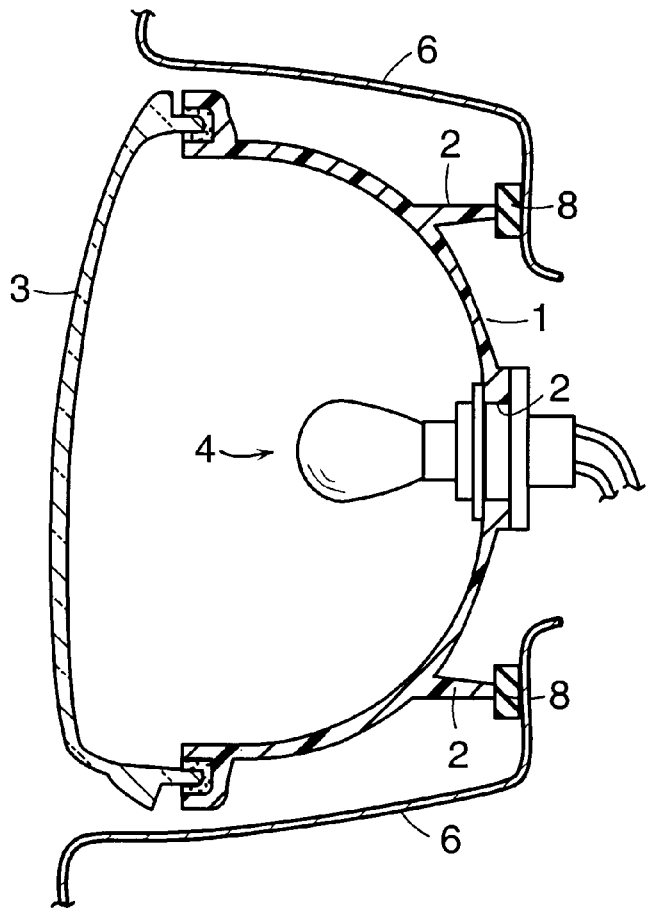
FIG. 5 is a sectional view showing a conventional automotive lamp.
Figure 6:
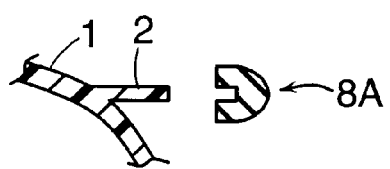
FIG. 6 is a sectional view of an essential part of another conventional automotive lamp.

FIG. 4 is a vertical sectional view showing a clearance lamp to which a second embodiment of the present invention is applied.

In the first embodiment described above, the seal leg 16 is disposed at a peripheral position on the back wall of the lamp body 10 in such a manner that the seal leg 16 surrounds the bulb insertion hole 11. In the second embodiment, however, a seal leg 17 projects from and extends along a bottom of a seal groove 13 formed in a periphery of the front opening of the lamp body 10 as shown in FIG. 4. The foamed gasket 20 is molded integrally with a tip end part 17a of the seal leg 17.

The other structures of the second embodiment are the same as those of the first embodiment described above and, accordingly, the description of which is omitted here.

As described above, according to the automotive lamp of the present invention, a gasket can be molded integrally with a seal leg merely by inserting the seal leg into a foamed gasket material injected into a molding groove. Therefore, the present invention greatly improves the yield rate of the gasket material, and reduces the cost for the gasket, which in turn reduces, the cost for the lamp.

Further, because the gasket is securely integrated with the seal leg, and because the gasket automatically becomes press-fitted between the seal leg and the automobile body panel at the same time the lamp is coupled to the automobile body, the workability is much improved.

The gasket tightly contacts to the seal leg and the automobile body panel when the lamp is coupled to the automobile body. Therefore, the sufficient sealability of the gasket can be maintained compared with the conventional gasket.

Incidentally, when the gasket is molded integrally with the tip end part of the seal leg, some of the molding steps can be readily automated. If some steps are automated, mass-production of the lamps can be achieved while excessively reducing the manual works.

In addition, if the seal leg is subjected to the surface active treatment, the gasket would hardly detach from the seal leg because of the high adhesibility of the foamed gasket to the seal leg. As a result, easy treatment of the lamp with which the gasket is integrated, improved operation for coupling the lamp to the automobile body, and good workability when the gasket is fitted, can be accomplished.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. An automotive lamp, comprising:
   a lamp body;
   a seal leg projecting from said lamp body; and
   a gasket for disposition between said lamp body and an automobile body panel, said gasket being molded integrally with a tip end part of said seal leg, wherein said gasket is formed of a foamed material.

2. The automotive lamp according to claim 1, wherein said lamp body includes a back wall and a bulb hole in said back wall, said seal leg being annular and extending around said bulb hole in said lamp body.

3. The automotive lamp according to claim 1, wherein the foamed material of said gasket is based on one of polyester, one-liquid urethane, two-liquid urethane and silicone resin.

4. The automotive lamp according to claim 1, wherein said seal leg is subjected to a surface active treatment.

5. The automotive lamp according to claim 4, wherein the surface active treatment is selected from the group consisting of primer, frame, UV, corona and plasma treatment.

6. The automotive lamp according to claim 1, wherein said lamp body and said seal leg are formed from resin material.

7. The automotive lamp according to claim 6, wherein the resin material for said lamp body and said seal leg is selected from the group consisting of acrylonitrile-butadiene-styrene, acrylonitrile-acryl rubber-styrene, polymethylmethacrylate, and polypropylene.

8. The automotive lamp according to claim 1, wherein said seal leg projects from a back wall of said lamp body to surround a bulb insertion hole formed in said lamp body.

9. The automotive lamp according to claim 1, wherein said seal leg projects from and extends along a bottom of a seal groove formed in a periphery of a front opening of said lamp body.

10. The automotive lamp according to claim 1, wherein the material of said gasket has a heat-resistivity.

* * * * *